July 11, 1944.  E. K. KAPRELIAN  2,353,565
OPTICAL VIEW FINDER
Filed Nov. 4, 1943

Inventor
Edward K. Kaprelian

Patented July 11, 1944

2,353,565

UNITED STATES PATENT OFFICE 2,353,565

OPTICAL VIEW FINDER

Edward K. Kaprelian, Alexandria, Va., assignor to Isadore Nochlin and Sam Schwartz, trading as Camera Supply Company, Washington, D. C.

Application November 4, 1943, Serial No. 508,947

9 Claims. (Cl. 88—1.5)

This invention relates to variable field view finders for use with photographic cameras and is particularly directed to an optical view finder of variable magnification in which the change in angle of view is obtained by altering the separation between various lens elements within the finder to bring about a new distribution of power.

U. S. Patent No. 2,183,523 issued December 19, 1939, to Wood describes a variable field view finder of this general type in which the necessity of eye accommodation for various settings is eliminated by providing a compound eyepiece which reimages the image formed by the front element at a fixed distance regardless of the setting. The arrangement shown in the Wood patent requires more or less complicated mechanical means for moving one of the eyepiece components in a forward direction simultaneously with the rearward movement of one component of the front system. Systems of the type shown in the Wood patent and in Patent No. 2,043,900 to Mihalyi are limited in practice to a range of 5 or 6 to 1 between the widest and narrowest angles of view. Thus for a 16 mm. movie camera the usual range of lens angles obtainable with system of the prior art is from 1″ to 6″ and for a double frame 35 mm. camera (1″ x 1½″ neg.) from 2″ to 10″.

The principal object of the invention is to provide a variable field view finder with a large range of angle of view, i. e. 15 or 20 to 1, with but one movable optical unit.

Another object of the invention is to provide a variable field view finder of compact size.

Another object of the invention is to provide a variable field view finder having little distortion.

According to the invention, simple means for adjusting the eyepiece are provided for compensating for the change of focusing power of the front component which results when the elements of the front component are separated to alter the angle of view. In the preferred embodiment of the invention the front component consists of a positive element placed before a powerful negative element. The rear component comprises a weak negative element with a stronger positive element spaced relatively far ahead of the negative element, preferably about half way between the weak negative element and the powerful negative element. The powers are so distributed in the system and the spacing is such that simultaneous movement of the second and third elements of the system in the same direction provides constant focusing power, i. e., it is not necessary for the eye to accommodate itself for the various adjustments of the system.

Other features and objects of the present invention are described in the following specification and the accompanying drawing in which.

Figure 1:
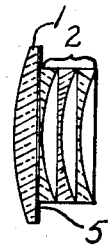
Fig. 1 shows the optical system of the finder with the elements in the position of widest angle of view.
Figure 1:
Figure 1:

In the drawing lenses 1 and 2 represent the front component of the finder while lenses 3 and 4 represent the rear component of the finder. Lens 1 is a plano convex and is fixed in position with the convex surface toward the incident light while the group of lenses designated as 2 comprises several deep plano concave elements, preferably three in number and placed as close to each other as possible with the plane surface facing the incident light. This group of lenses is movable. Lens 3 is double convex in form and is also movable. Lens 4 is double concave in form and is fixed.

Figure 2:
Fig. 2 shows the optical system of the finder with the elements in the position of the narrowest angle of view.
Figure 2:
Figure 2:
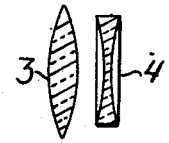

In Fig. 1, the system is shown in the position of widest angle of view. In this position and with the powers and dimensions set forth below the horizontal angle of view is approximately 50°. In practice elements 2 and 3 are mounted in a movable tube as a unit while elements 1 and 4 are mounted in cells at the front and rear ends, respectively, of the finder body. Lenses 2 and 3 may be moved rearwardly by any convenient mechanical expedient such as a multiple screw threaded tube through any intermediate position to the narrow angle or telephoto position shown in Fig. 2. In this position the horizontal angle of view has changed to about 3°. The rearward movement of elements 2 shifts the focus of the front component rearwardly about 75% of the travel of element 2 while rearward movement of element 3 shifts the focus of the rear component or eyepiece correspondingly so as to maintain the shifting image formed by the front component always in focus. Thus by properly choosing the powers and separations of the elements a single movable unit comprising part of each of the front and rear components suffices to change the field of view while simultaneously maintaining the image in focus. This results in a simpler mechanism by eliminating the separate movement of the rear component which movement, in a tubular type auxiliary view finder such as the optical system of the present invention is mainly intended for, would require an expensive complicated eyepiece structure.

A typical finder constructed according to the invention uses the following powers and separations: Lens 1 plano convex between +21 and +25 diopters; lens 2 plano concave between −45 and −60 diopters each; lens 3 double convex between +35 and +45 diopters and lens 4 double concave between +8 and −14 diopters. A mask 5, 7.5 mm. x 5 mm. with the system in its wide angle position, would give approximately the correct field for a 25 mm. lens on the ¾" x 1" (35 mm. Ciné) negative size. In the telephoto position, the angle of view would correspond to that of a 16" lens on this negative size. The mask is constructed of very thin material so as to permit elements 1 and 2 to be separated by only a very small space in the wide angle setting, preferably 1/16 mm. The spacing from the front face of element 2 to the front of element 3 would be between 26 and 33 mm. and the spacing between the front of element 2 to the front of element 4 would be between 55 and 65 mm. permitting a 26 mm. travel of elements 2 and 3 in this example.

The range of angles of view for the above example is such that a finder so constructed will accommodate the following lenses and negative sizes:

35 mm. Ciné (¾" x 1") ___ from 25 mm. to 16"
35 mm double frame
  (1" x 1½") _____ from 45 mm. to 30"
16 mm. Ciné _____ from 12½ mm. to 6"
8 mm. Ciné _____ from 6 mm. to 3"

A corresponding range of angles could be covered for other negative sizes. By altering the balance of power between the elements of the front component, the range of angles may be shifted. Thus by weakening element 1 and increasing the power of element 2, the horizontal angle of view may be increased to over 70°, thus including the extreme wide angle lenses such as 28 mm. f. l. for the 1 x 1½" negative size.

Figure 3:
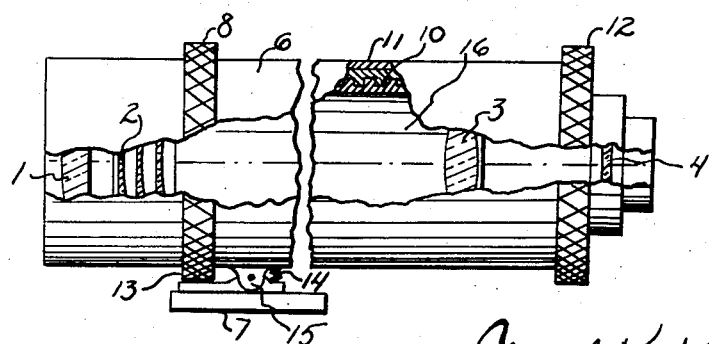
Fig. 3 shows the optical system as embodied in a tubular type auxiliary view finder.

Fig. 3 shows the optical system as embodied in a tubular type auxiliary view finder. The finder body, generally designated at 6 is supported on a conventional foot adapted to engage the standard slide with which many cameras are normally fitted. An adjusting ring 8 carries a cam 13 at its lower end. The foot 7 is pivoted at 15 by a pin so that spring 14 normally causes the front end of foot 7 to rest upwardly against cam 13. Rotation of ring 8 will cause the finder body to tilt, thereby providing a correction for parallax. Lenses 1 and 4 are mounted in cells or otherwise in the front and rear ends of the body respectively, while elements 2 and 3 are mounted in a movable tube 16 which may be shifted by rotating ring 12. The shifting mechanism may constitute a multiple thread screw portion generally designated at 10. Ring 12 may carry several sets of scales to correspond to the focal lengths and negative sizes required.

What I claim and desire to secure by Letters Patent of the United States is:

1. A view finder system for viewing a subject and adapted to have an adjustable field of view to correspond to camera lenses of different focal lengths comprising a negative front component consisting of a fixed positive element and a movable negative element having a substantially greater power than the fixed positive element spaced rearwardly therefrom and said component forming a virtual image, a positive rear component consisting of a fixed negative element and a movable positive element spaced forwardly therefrom and having a substantially greater power than the fixed negative element and means for moving said movable elements simultaneously in the same direction while maintaining a fixed separation between the movable elements.

2. A view finder system for viewing a subject and adapted to have an adjustable field of view to correspond to camera lenses of different focal lengths comprising a negative front component consisting of a fixed positive element and a movable negative element having a substantially greater power than the fixed positive element spaced rearwardly therefrom and forming a virtual image, a positive rear component consisting of a fixed negative element and a movable positive element spaced forwardly therefrom and having a substantially greater power than the fixed negative element and means for moving said movable elements simultaneously in the same direction while maintaining a fixed separation between the movable elements thereby maintaining the virtual image formed by the system at a fixed distance regardless of the position of the movable elements.

3. A view finder system for viewing a subject and adapted to have an adjustable field of view to correspond to camera lenses of different focal lengths comprising a negative front component consisting of a fixed positive element and a movable negative element spaced rearwardly therefrom, said negative element having a power of six to nine times that of the positive element, a positive rear component consisting of a fixed negative element and a movable positive element spaced forwardly therefrom, said positive element having a power of two to six times that of the negative element and means for moving said movable elements simultaneously and in the same direction.

4. A view finder system for viewing a subject and adapted to have an adjustable field of view to correspond to camera lenses of different focal lengths comprising a negative front component consisting of a fixed positive element and a movable negative element spaced rearwardly therefrom, said positive element having a power of from .5 to .08 of that of the negative element, a positive rear component consisting of a fixed negative element and a movable positive element spaced forwardly therefrom said negative element having a power of from .5 to .1 of that of the positive element and means for moving said movable elements simultaneously and in the same direction while maintaining a constant separation of the order of the focal length of the rear movable element between said movable elements.

5. A view finder system as claimed in claim 4 in which the length of travel of the movable elements is approximately equal to the spacing between the movable elements.

6. A view finder system for viewing a subject and adapted to have an adjustable field of view to correspond to camera lenses of different focal lengths comprising a front fixed lens element, a rear fixed lens element and first and second inner axially movable lens elements, said front fixed lens and said first movable lens forming a virtual image and said rear fixed element and said second movable element comprising together a positive eyepiece and means for moving both inner movable lens elements while maintaining a fixed separation between inner elements, the system having a given length between the fixed front and rear elements, the focal length of the front fixed element being between one fourth and three fourths of the length of the system.

7. A view finder system as claimed in claim 6 wherein the focal length of the first movable lens is between one twentieth and one fifth of the length of the system.

8. A view finder system as claimed in claim 6 wherein the separation between the movable elements is between .4 and .25 of the length of the system.

9. A view finder system as claimed in claim 6 wherein the total travel of the movable elements is between .6 and .25 of the length of the system.

EDWARD K. KAPRELIAN.